United States Patent
Wilson

(10) Patent No.: US 7,146,440 B1
(45) Date of Patent: Dec. 5, 2006

(54) DMA ACKNOWLEDGE SIGNAL FOR AN IDE DEVICE

(75) Inventor: James Allen Wilson, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 38 days.

(21) Appl. No.: 10/663,611

(22) Filed: Sep. 16, 2003

(51) Int. Cl.
*G06F 13/38* (2006.01)

(52) U.S. Cl. ............................ 710/62; 710/22; 710/72; 710/74; 710/300

(58) Field of Classification Search ................ None
See application file for complete search history.

(56) References Cited

U.S. PATENT DOCUMENTS 5,596,562 A * 1/1997 Chen ........................ 710/315
6,006,295 A * 12/1999 Jones et al. ................. 710/62
6,418,501 B1 * 7/2002 Gama et al. ................ 710/305

OTHER PUBLICATIONS

Messmer, Hans-Peter "The Indispensable PC Hardware Book" Fourth Edition, Chapter 29 Hard Disk, pp. 871-910, Jun. 30, 1999.
Advanced Micro Devices, Inc. "Alchemy™ Au1000™ Processor from AMD Data Book—Preliminary Information" Document No. 2000-0001, Document Revision 0.41, Aug. 2002.

\* cited by examiner

*Primary Examiner*—Ilwoo Park
(74) *Attorney, Agent, or Firm*—Hamilton & Tuttle, LLP; Stephen A. Terrile

(57) ABSTRACT

A method for using a personal computer memory card international association (PCMCIA) controller to communicate with an Integrated Drive Electronics (IDE) drive which includes performing a transfer between the static random access memory (SRAM) controller and the IDE drive using PCMCIA interface signals to communicate with the IDE drive and a general purpose input/output signal to communicate with an interrupt request of the IDE drive.

12 Claims, 3 Drawing Sheets

Truth Table for $\overline{\text{DMACK}}$

| $\overline{\text{PCE[0]}}$ | DMARQ0 | $\overline{\text{DMACK}}$ |
|---|---|---|
| 0 | 0 | $\overline{\text{DMACK}}$ |
| 0 | 1 | 0 |
| 1 | 0 | 1 |
| 1 | 1 | 0 |

DMA ACKNOWLEDGE SIGNAL FOR AN IDE DEVICE

BACKGROUND OF THE INVENTION

The present invention relates to integrated drive electronics disc drive access and more particularly to direct memory access for integrated drive electronics type disc drives.

Integrated Drive Electronics (IDE) is a type of hardware interface widely used to connect hard disks, CD-ROMS and tape drives to a computer system. With an IDE type disc drive, drive controller electronics are built into the drive itself. In known computer systems, IDE drives are attached to a computer system using an IDE host adapter card. Alternately, one or more Enhanced IDE (EIDE) sockets may be built onto a computer system motherboard; each socket may connects up to two IDE drives.

The IDE interface conforms to the AT Attachment (ATA) specification. A variation of the ATA specification is the ATA Packet Interface (ATAPI) which defines an IDE interface for CD-ROMs and tape drives. Another variation of the ATA specification is the Fast ATA (ATA-2) which defines faster transfer rates used in Enhanced IDE (EIDE). Another variation of the ATA specification is the ATA-3 which adds interface improvements, including the ability to report potential problems.

A known type of memory access is referred to as a Direct Memory Access (DMA). A DMA transfer transfers data directly from one memory to another memory without using a system processor. Although DMA may periodically steal cycles from a processor, data are transferred much faster than if a system processor were involved with every byte of the data transfer.

One challenge associated with systems providing an IDE interface to an IDE type drive relates to enabling DMA data transfers in systems in which DMA transfers are not enabled within the IDE interface.

SUMMARY OF THE INVENTION

In accordance with the present invention, a system is provided with an IDE interface which includes a DMA acknowledge control circuit to enable DMA data transfers to an IDE type device.

In one embodiment, the invention relates to a method for using a personal computer memory card international association (PCMCIA) controller to communicate with an Integrated Drive Electronics (IDE) drive which includes performing a transfer between the static random access memory (SRAM) controller and the IDE drive using PCMCIA interface signals to communicate with the IDE drive and a general purpose input/output signal to communicate with an interrupt request of the IDE drive.

In another embodiment, the invention relates to a method for using a personal computer memory card international association (PCMCIA) controller to communicate with an Integrated Drive Electronics (IDE) drive which includes performing a transfer between the PCMCIA controller and the IDE drive using PCMCIA interface signals to communicate with the IDE drive, and generating a DMA acknowledge signal based upon a DMA request signal and a chip enable signal.

In another embodiment, the invention relates to an apparatus for communicating with an Integrated Drive Electronics (IDE) drive which includes a personal computer memory card international association (PCMCIA) controller, the PCMCIA controller interfacing with signals conforming to a PCMCIA interface, the PCMCIA controller performing a transfer between the PCMCIA controller and an IDE drive using the PCMCIA interface signals to communicate with the IDE drive, and a DMA acknowledge control circuit, the DMA acknowledge control circuit generating a DMA acknowledge signal based upon a DMA request signal and a chip enable signal.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
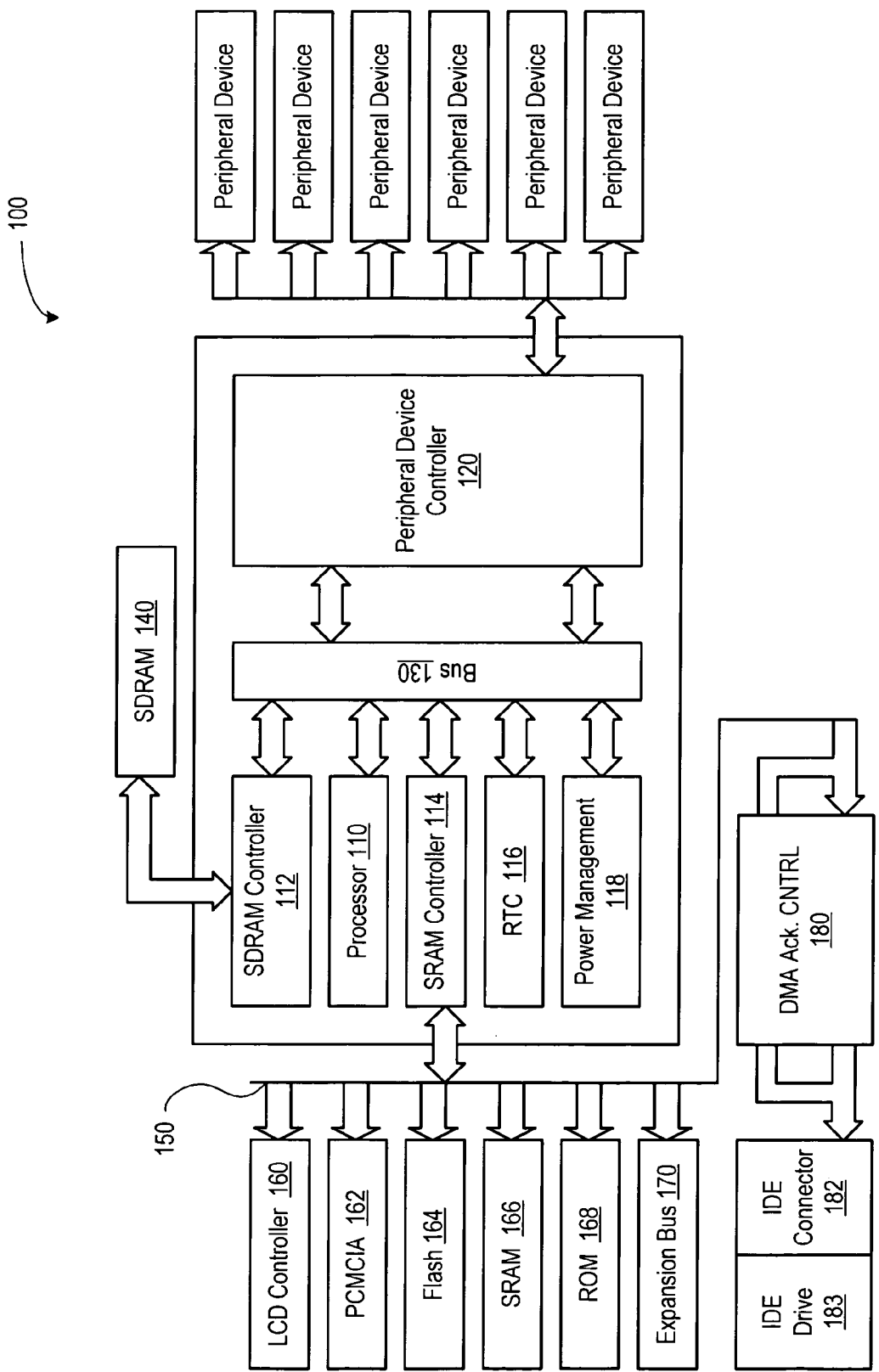
FIG. 1 shows a schematic block diagram of a system which includes a DMA acknowledge control circuit.

Referring to FIG. 1, system 100 designed for use in mobile information appliances. System 100 is preferably a complete system on a chip (SOC) based on a MIPS32 instruction set. The system 100 is designed to operate at low power.

System 100 includes a processor 110, a synchronous dynamic random access memory (SDRAM) controller 112, a static random access memory (SRAM) controller 114, a real time clock 116, a power management module 118 and a peripheral device control module 120 all interconnected via bus 130.

The peripheral device control module 120 may be coupled to one or more peripheral devices such as an Ethernet multiply-Accumulate (MAC) controller, a universal serial bus (USB) device and host controller, a universal asynchronous receiver transmitter (UART) controller, an Infrared Data Association (IrDA) controller, an audio code '97 (AC'97) controller, and a secure digital (SD) controller.

SDRAM controller 112 is coupled to SDRAM 140. SRAM controller 114 is coupled to a static bus 150. The static bus 150 is a general purpose bus which includes a 32-bit address path, a 32-bit data bus, a plurality of control signal paths, including a plurality of general purpose I/O signal paths. Some or all of the control signal paths and the general purpose I/O signal paths may be used depending on the type of device with which the SDRAM controller 114 is communicating.

Static bus 150 is also coupled to one or more static bus devices such as, e.g., an LCD controller 160, a personal computer memory card international association (PCMCIA) device 162, a flash memory device 164, SRAM 166, read only memory (ROM) 168 and an expansion bus 170. Static bus 150 is also coupled to a DMA acknowledge control circuit 180. The DMA acknowledge control circuit 180 is in turn coupled to an IDE connector 182 to which an IDE disk drive 183 may be connected. The SRAM controller 114 functions as a general purpose bus controller and may communicate with any one of a plurality of static bus devices. For example, when SRAM controller 114 is communicating with the SRAM 166, then SRAM controller 114 functions as an SRAM controller. When SRAM controller 114 is communicating with a PCMCIA device 162, then the SRAM controller 114 functions as a PCMCIA controller.

The static bus 150 may interface with Integrated Drive Electronics (IDE) hard drives via a modified PCMCIA interface. Such an interface eliminates the need for an external disk drive controller. The static bus 150 interfaces with IDE drives via the DMA acknowledge control circuit 180. The DMA acknowledge control circuit 180 provides a direct interface with an IDE drive when accessing the IDE drive in PIO mode. The DMA acknowledge control circuit 180 enables a circuit which is not designed for DMA access to IDE to perform a DMA data transfer to IDE. The DMA transfer mode is a master transfer mode: The DMA transfer is initiated by the processor 110. When communicating with the IDE drive in a PIO mode, the interface is directly between the SRAM controller 114 and the IDE drive 183; there is no need for the DMA acknowledge signal to be generated.

Figure 2:
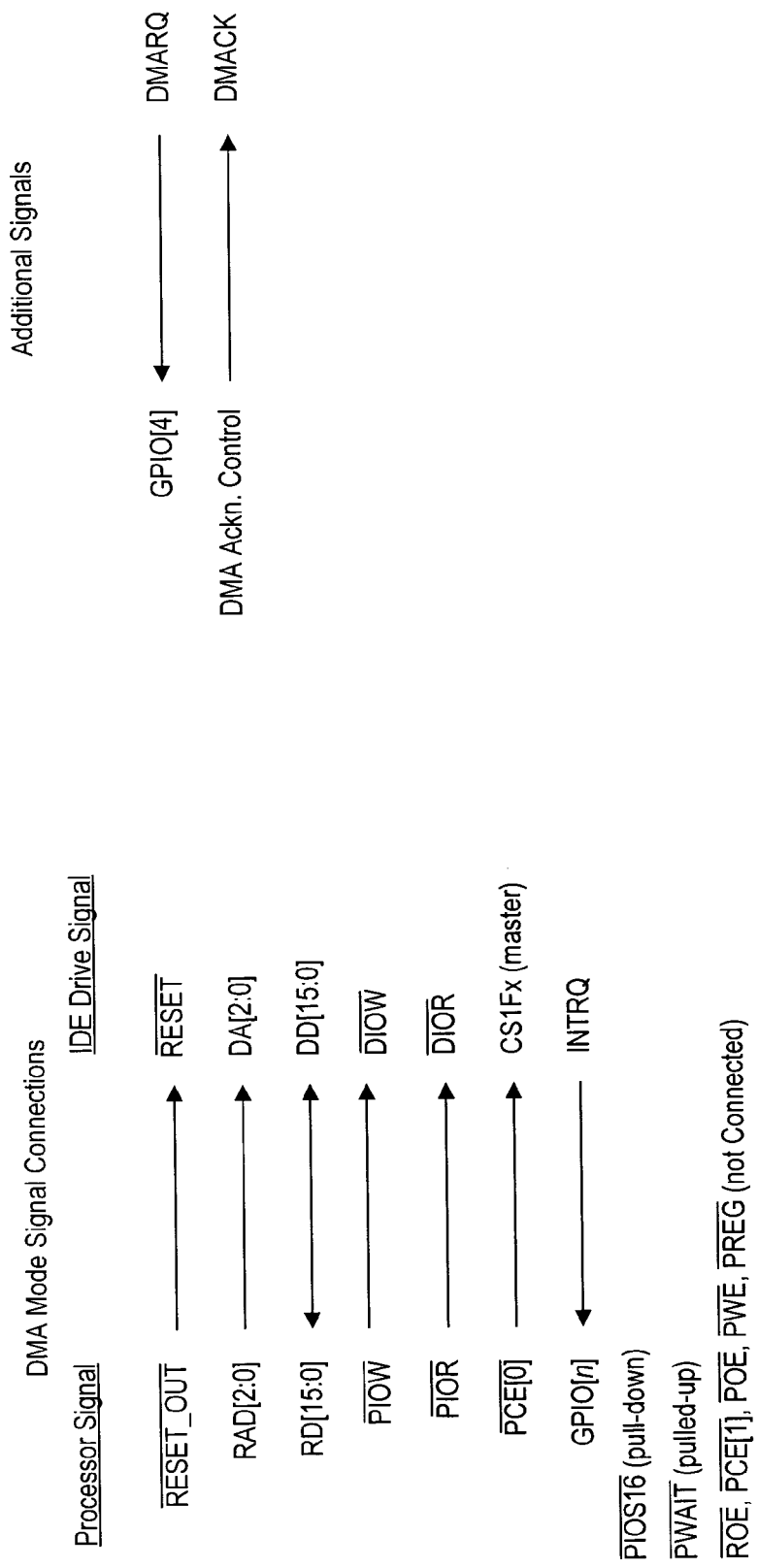
FIG. 2 shows a diagram of the signal connections between processor signals and IDE drive signals.

Referring to FIG. 2, one of the modes in which the SRAM controller 114 functions is as a PCMCIA interface in which the SRAM controller 114 provides a PCMCIA interface. The PCMCIA interface may be used by the SRAM controller 114 to provide an IDE interface. More specifically, when the SRAM controller 114 is configured for the PCMCIA mode, as indicated via the static bus chip select signal, the signals set forth in FIG. 2 are used to interface to an IDE device via the IDE connector 182.

More specifically, when providing an IDE interface, certain PCMCIA interface signals correspond to certain IDE interface signals. For example, the PCMCIA reset signal (RESET_OUT), which is used reset a PCMCIA device, corresponds to the IDE reset signal ($\overline{\text{RESET}}$), which is used to reset the IDE disk drive. The 3-bits of the PCMCIA address bus (RAD[2:0]), correspond to three bits of the IDE address bus (DA[2:0]), which correspond to bits 2–0 of the address bus of the IDE interface. The 16 bits of the PCMCIA data bus (RD[15:0]) are bi-directionally coupled with the 16 bits DD[15:0] signal, which correspond to bits 15–0 of the data bus of the IDE interface. The PCMCIA write cycle indication ($\overline{\text{PIOW}}$), which is an output signal indicating an I/O write cycle, corresponds to the IDE write signal ($\overline{\text{DIOW}}$), which indicates to the IDE disk drive to write data over the I/O channel. The PCMCIA read cycle indication ($\overline{\text{PIOR}}$), which is an output signal indicating an I/O read cycle, corresponds to the IDE read signal ($\overline{\text{DIOR}}$), which indicates to the IDE disk drive to read data over the I/O channel.

Bit zero of the 2-bit PCMCIA enable ($\overline{\text{PCE}[0]}$), which are active low card enable bits, correspond to the IDE chip select signal (CS1Fx(master)), which indicates a chip select for base address 1f0h. The processor signal $\overline{\text{PCE}[0]}$ functions as a chip select for the IDE drive.

The n bit of the GPIO signal, GPIO[n], which is a general purpose I/O signal of the static bus 150, receives the INTRQ signal, which indicates an interrupt request from the IDE drive. The GPIO[n] signal functions as an interrupt from the IDE drive to the processor 110. The IDE interrupt may be coupled to any available GPIO signal path of the static bus 150.

Additionally, the PCMCIA port select signal ($\overline{\text{PIOS16}}$) is pulled down (i.e., is active) to indicate that the IDE drive operates in a 16-bit mode (this signal may be connected directly to the IDE drive via the connector 182). The PCMCIA wait signal ($\overline{\text{PWAIT}}$) is pulled up to indicate not to delay completion of a pending cycle.

Additionally, a plurality of PCMCIA signals are not needed or used for the IDE disk drive. For example, the PCMCIA output enable signal ($\overline{\text{ROE}}$) is not connected, Bit 1 of the two bit PCMCIA chip enable signal ($\overline{\text{PCE}[1]}$) is not connected, the PCMCIA memory output enable signal ($\overline{\text{POE}}$) is not connected, the PCMCIA memory write enable signal ($\overline{\text{PWE}}$) is not connected, and the attribute memory access signal ($\overline{\text{PREG}}$) is not connected.

When functioning in a DMA access mode, SRAM controller 114 in conjunction with the DMA acknowledge control circuit 180 generate and use additional signals. More specifically, the GPIO[4] signal functions as a DMA request signal from the IDE drive. The GPIO[5] signal could also be used for this function. GPIO[n] is an interrupt from the IDE drive to the processor (the IDE interrupt can be tied to any available GPIO).

The DMA acknowledge control circuit 180 generates the IDE DMA acknowledge signal (DMACK) based upon a combination of the chip enable signal $\overline{\text{PCE}[0]}$ and the DMA request signal (DMARQ).

Figures 3, 4:
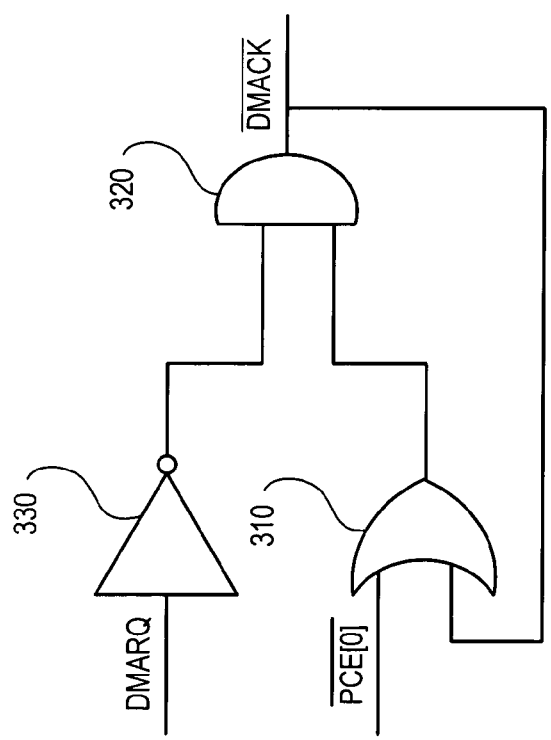
FIG. 3 shows a schematic block diagram of a DMA acknowledge control circuit.
FIG. 4 shows a truth table of the operation of the DMA acknowledge control circuit.

Referring to FIG. 3, the DMA acknowledge control module 180 generates a DMA acknowledge (DMACK) signal to the IDE drive via the DMA request from the IDE drive and the $\overline{\text{PCE}[0]}$ signal from the processor 110. This assumes a zero delay from DMA request to DMA acknowledge for the IDE specification. The $\overline{\text{PCE}[0]}$ signal is used to ensure the hold time after the last transfer.

The DMA acknowledge control module 180 includes OR gate 310, AND gate 320 and inverter 330. Inverter 330 receives the DMA request signal (DMARQ) signal and generates an inverted DMARQ signal. OR gate 310 receives a chip enable ($\overline{\text{PCE}[0]}$) signal as well as the DMACK signal.

FIG. 4 sets forth the operation of the DMA acknowledge control module 180. More specifically, when DMARQ=1, $\overline{\text{DMACK}}$=0. The state of the $\overline{\text{PCE}[0]}$ signal has no affect on the $\overline{\text{DMACK}}$ signal. When DMARQ=0 and $\overline{\text{PCE}[0]}$=1, $\overline{\text{DMACK}}$=1. When DMARQ=0 and $\overline{\text{PCE}[0]}$=0, $\overline{\text{DMACK}}$= $\overline{\text{DMACK}}$. I.e., $\overline{\text{DMACK}}$ does not change.

When generating a DMA request, the processor 110 is configured to use one of the external DMA request lines: DMA_REQ0 (GPIO4) or DMA_REQ1 (GPIO5). The processor 110 may also use GPIO208 and GPIO209.

The DMA is configured in the DMA_modeset register for a Device Address High (DAH) value of 1111 (for the upper address bits for PCMCIA), Device ID (DID) of 2 for DMA_REQ0, transfer size (TS) of 4, and device width (DW) of 16 bits.

In operation, the processor 110 initializes the DMA channel to use an external request. The processor 110 writes the command to the IDE drive 183. The IDE drive sets the busy BSY bit. When the drive is ready for a transfer, the drive sets the DMARQ signal. The processor 110 detects that the DMARQ is set and transfers the data. When all of the data has been transferred, the IDE drive 183 asserts the interrupt request signal INTRQ signal. When the processor 110 detects the INTRQ signal, the processor reads the STATUS register of the IDE drive 183. The IDE drive 183 clears the INTRQ signal when the STATUS register is read by the processor 110.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while the DMA acknowledge control circuit is shown with a particular configuration of logic, it will be appreciated that other logic configurations may be used to achieve functionally equivalent results.

Also for example, while the DMA acknowledge control circuit is shown as a discrete circuit, it will be appreciated that such a circuit could be incorporated into either the SRAM controller or the IDE interface.

Also, for example, while certain portions of the preferred embodiment are shown as active low and other portions as active high, it will appreciated that the choice of whether a signal, a circuit or portion thereof is active low or active high is merely one of design.

Also, for example, the above-discussed embodiments include modules that perform certain tasks. The modules discussed herein may include be instantiated as hardware, software or some combination of hardware and software. Additionally, those skilled in the art will recognize that the separation of functionality into modules is for illustrative purposes. Alternative embodiments may merge the functionality of multiple modules into a single module or may impose an alternate decomposition of functionality of modules.

Consequently, the invention is intended to be limited only by the spirit and scope of the appended claims, giving full cognizance to equivalents in all respects.

What is claimed is:

1. A method for using a personal computer memory card international association (PCMCIA) controller to communicate with an Integrated Drive Electronics (IDE) drive comprising:
    performing a transfer between the static random access memory (SRAM) controller and the IDE drive using PCMCIA interface signals to communicate with the IDE drive and a general purpose input/output signal to communicate with an interrupt request of the IDE drive; and,
    generating a Direct Memory Access (DMA) acknowledge signal for the IDE drive based upon a DMA request signal from the IDE drive and a chip enable signal.

2. The method of claim 1 wherein:
    when the DMA request signal is active, then the DMA acknowledge signal for the IDE drive is active.

3. The method of claim 1 wherein:
    when the DMA request signal is inactive and the chip enable signal is inactive, then the DMA acknowledge signal for the IDE drive is inactive.

4. The method of claim 1 wherein:
    when the DMA request signal is inactive and the chip enable signal is active, then the DMA acknowledge signal for the IDE drive does not change state.

5. A method for using a personal computer memory card international association (PCMCIA) controller to communicate with an Integrated Drive Electronics (IDE) drive comprising:
    performing a transfer between the PCMCIA controller and the IDE drive using PCMCIA interface signals to communicate with the IDE drive;
    generating a DMA acknowledge signal based upon a DMA request signal and a chip enable signal.

6. The method of claim 5 wherein:
    when the DMA request signal is active, then the DMA acknowledge signal for the IDE drive is active.

7. The method of claim 5 wherein:
    when the DMA request signal is inactive and the chip enable signal is inactive, then the DMA acknowledge signal for the IDE drive is inactive.

8. The method of claim 5 wherein:
    when the DMA request signal is active and the chip enable signal is inactive, then the DMA acknowledge signal for the IDE drive does not change state.

9. An apparatus for communicating with an Integrated Drive Electronics (IDE) drive comprising:
    a personal computer memory card international association (PCMCIA) controller, the PCMCIA controller interfacing with signals conforming to a PCMCIA interface, the PCMCIA controller performing a transfer between the PCMCIA controller and an IDE drive using the PCMCIA interface signals to communicate with the IDE drive; and,
    a DMA acknowledge control circuit, the DMA acknowledge control circuit generating a DMA acknowledge signal based upon a DMA request signal and a chip enable signal.

10. The apparatus of claim 9 wherein:
    when the DMA request signal is active, then DMA acknowledge control circuit sets the DMA acknowledge signal for the IDE drive active.

11. The apparatus of claim 9 wherein:
    when the DMA request signal is inactive and the chip enable signal is inactive, the DMA acknowledge control circuit sets the DMA acknowledge signal for the IDE drive inactive.

12. The apparatus of claim 9 wherein:
    when the DMA request signal is active and the chip enable signal is inactive, the DMA acknowledge control circuit does not change the state of the DMA acknowledge signal for the IDE drive.

* * * * *